Patented Jan. 3, 1950

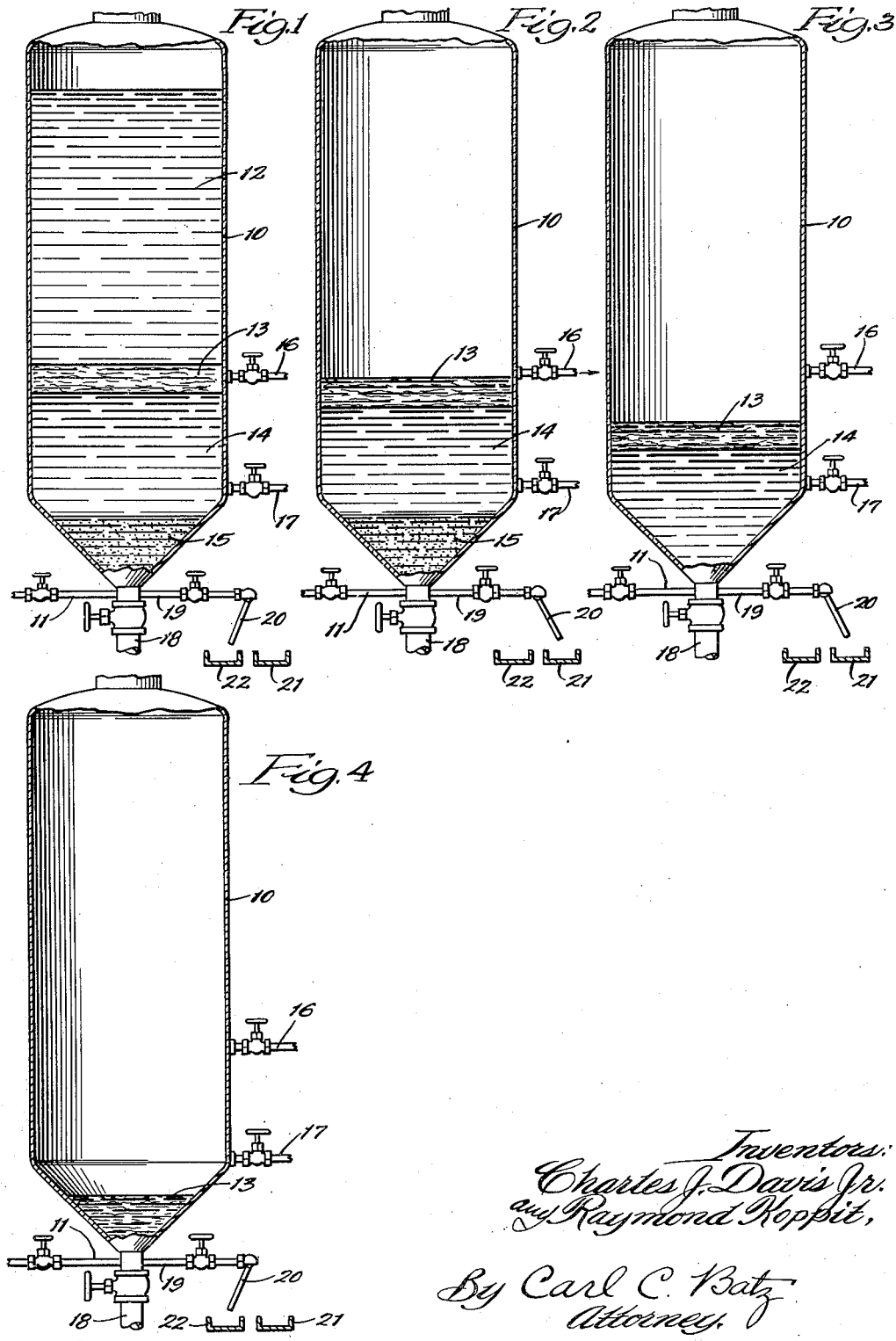

2,493,459

UNITED STATES PATENT OFFICE 2,493,459

METHOD AND APPARATUS FOR RENDERING FATS

Raymond Koppit and Charles J. Davis, Jr., Chicago, Ill., assignors to Armour and Company, Chicago, Ill., a corporation of Illinois Application March 12, 1945, Serial No. 582,280

3 Claims. (Cl. 260—412.6)

This invention relates to method and apparatus for rendering fats and more particularly to the treatment of hog cuttings to produce lard, edible fats and other fat products.

In the treatment of hog cuttings it has heretofore been the usual practice to place the cuttings in a treating tank and to cook them by passing steam therethrough at a pressure of about 50 lb. per sq. inch for a minimum period of three to four hours. This cooking reduces the cuttings to lard, floaters, tankwater and tankage.

Upon completion of the cooking the steam is shut off and the cooked stock is allowed to settle into an upper stratum of lard, a next lower stratum of floaters, a next lower stratum of tankwater and a bottom stratum of tankage. The lard is then drawn off through a pipe tapped into the tank and which lies above the lower level of the lard stratum, this being necessary to insure that the pipe connection will be above the floaters. To complete the lard draw-off, water is pumped into the tankwater stratum to raise the lard level to the draw-off pipe, completion of the lard draw-off being indicated when floaters appear in the pipe.

The floaters are then drawn off through a pipe somewhat below the first pipe and above the bottom level of the floaters stratum. Substantially complete draw-off of the floaters is effected by pumping additional water into the tankwater stratum to bring the floaters level up to the level of the second pipe.

Thereafter the tankwater and tankage are blown off to a settling tank and resettled. Fat rising to the top of this mixture may be skimmed off and rendered with the floaters into edible pork fat. The remaining water is then evaporated and the tankage used in the production of liquid stick and pressed tankage or otherwise as desired.

In the practice of this method the addition of water to the tank causes a certain agitation of the material resulting in mixing. Fat remaining in the tank after draw-off of the floaters is mixed with the tankwater and tankage during blow-off thereof and is not completely recovered by skimming in the settling tank. This decreases the recovery of edible pork fat and increases the percentage of fat recovered in inedible form such as liquid stick. In addition the time required for resettling involves an additional loss, and evaporation of the large amount of water used in the process is expensive.

The present invention provides a process and apparatus in which these difficulties are overcome, in which recovery and quality of edible pork fat is increased, in which both time required and amount of water employed are reduced, and which results in substantial overall savings as compared with present practices.

The invention will be better understood by reference to the accompanying drawing in which:

Figure 1 is a diagrammatic view of the apparatus illustrating the stock therein at the end of the cooking and stratifying steps; and Figures 2, 3 and 4 are similar views illustrating different stages in the process.

In practicing the present invention, the pork cuttings or like material to be rendered are placed in a vertically elongated tank 10 and are cooked in the usual manner by admitting steam to the lower part of the tank through a valve pipe 11. Upon completion of the cooking, the steam is shut off and the material in the tank is allowed to settle into an upper stratum 12 of lard, a next lower stratum 13 of floaters, a next lower stratum 14 of tankwater and a bottom stratum 15 of tankage.

A valved lard draw-off pipe 16 is connected to the tank and is so located that it normally lies slightly below the lard stratum and opposite the floaters stratum. A second valved draw-off pipe 17 is connected to the lower part of the tank opposite the tankwater stratum.

To draw off the lard, the pipe 16 is first opened and the material flowing therethrough is observed. Normally this material will be floaters which are collected separately to be mixed with the main body of floaters drawn off as described hereinafter. The pipe 17 is then opened to draw off tankwater until lard starts to flow through the pipe 16. At this time the pipe 17 is closed to hold the bottom of the lard stratum level with the pipe 16 and all of the lard is drawn off. It will be noted that this operation causes substantially no agitation of the material so that mixing of adjacent strata is minimized. The condition of the tank at the end of the lard draw-off operation is indicated in Figure 2.

Thereafter a valved pipe 18 connected to the bottom of the container may be opened to draw off the tankage 15. This pipe is closed as soon as all of the tankage is removed to leave the apparatus in the condition shown in Figure 3. The removed tankage may be treated in the usual manner to form pressed tankage and liquid stick.

The tankwater and floaters may be withdrawn through the pipe 18 but are preferably withdrawn through a separate valved pipe 19. A swinging nozzle 20 is connected to the pipe 19 adapted to be swung over either of two troughs 21 or 22 for collection of tankwater and floaters respectively. The tankwater 14 is first drawn off into the trough 21 leaving the apparatus in the condition shown in Figure 4. The floaters are then drawn off into the trough 22 finally to empty the tank.

The tankwater may be screened to recover solids therefrom and after settling may be skimmed to recover fat therefrom. This fat is mixed with the floaters and rendered as edible pork fat.

The tankwater is then evaporated to a solid content of about 65%. This material may be further reduced to produce liquid stick.

A comparison of the conventional method as described above and the method of the present invention may be readily obtained from the following tabulations of the actual results obtained in operations under the two methods. In the operations on the conventional method herein reported 1,138,365 pounds of cutting fat were rendered and in the operations on the new method 1,024,708 pounds of cutting fat were rendered.

*Tankwater*

| | Volume | Solids | | NH₃ | Fat | Solids from Screened Water | Skimming from Tankwater |
|---|---|---|---|---|---|---|---|
| | | Total | Susp. | | | | |
| | Gallons | | | | | Pounds | Pounds |
| New Method | 51,694 | 9.84 | .57 | 24.6 | 1.85 | 7,273 | 476 |
| Conventional Method | 99,592 | 6.81 | .97 | 19.55 | 8.16 | 7,267 | 4,865 |

*Rendered pork fat*

| | Floaters | Skimmed from Tankwater | Total |
|---|---|---|---|
| | Pounds | Pounds | Pounds |
| New Method | 14,575 | 476 | 15,051 |
| Conventional Method | 8,675 | 4,865 | 13,540 |

*Tankage*

| | Yield | NH₃ | Fat | Fat Recovered (inedible) |
|---|---|---|---|---|
| | | | | Pounds |
| New Method | 4,019 | 10.13 | 14.14 | 336 |
| Conventional Method | 4,137 | 9.34 | 18.32 | 1,506 |

*Liquid stick*

| | Gallons | Pounds | Analysis | |
|---|---|---|---|---|
| | | | NH₃ | Fat |
| New Method | 53,770 | 42,600 | 18.02 | 3.14 |
| Conventional Method | 59,320 | 44,500 | 18.15 | 5.20 |

In the rendered pork fat the new method shows a marked improvement over the conventional method, the yield being about 10% greater from about 10% less cuttings. Furthermore, it has been found that this product has a better quality than that produced by the conventional method since it can be handled faster and is subject to less contamination by mixing with the tankage. Since the rendered pork fat has a higher commercial value than any of the other products except the lard, the increase in its yield and quality under the present method is extremely important.

It will be noted also that under the present method the total amount of tankwater is only slightly over half that of the conventional method. Since all of this water must be evaporated to recover the liquid stick this results in another important improvement.

While one embodiment of the invention has been shown and described in detail, it will be understood that this is illustrative only and is not intended to be taken as a definition of the scope of the invention, reference being had for this purpose to the appended claims.

What is claimed is:

1. The method of rendering pork fats comprising cooking fat-containing stock in the presence of steam to produce a mixture of lard, floaters, tankwater and tankage, allowing the cooked stock to settle into strata, withdrawing tankwater to lower the lard level to a draw-off point above the bottom of the stratified stock, withdrawing the lard at the draw-off point, and thereafter separately withdrawing from the bottom of the stratified stock the tankage, the remaining tankwater, and the floaters in order.

2. The method of rendering pork fats comprising cooking fat-containing stock in the presence of steam to produce a mixture of lard, floaters, tankwater and tankage, allowing the cooked stock to settle into strata, withdrawing tankwater to lower the lard level to a draw-off point above the bottom of the stratified stock, withdrawing the lard at the draw-off point, withdrawing the tankage from the bottom of the stratified stock, and thereafter successively withdrawing the tankwater and the floaters from the bottom of the stock.

3. The method of rendering pork fats comprising placing fat containing stock in a vertically elongated container, passing steam through the stock to cook it down into lard, floaters, tankwater and tankage, allowing the cooked stock to settle into strata, withdrawing tankwater from the container to lower the bottom level of the lard stratum to a draw-off point intermediate the vertical height of the container, drawing off the lard from the container at the draw off point, and thereafter successively and separately withdrawing the tankage, the tankwater and the floaters from the bottom of the container.

RAYMOND KOPPIT.
CHARLES J. DAVIS, Jr.

REFERENCES CITED

The following references are of record in the file of this patent:

UNITED STATES PATENTS

| Number | Name | Date |
| --- | --- | --- |
| Re. 9,254 | Andrew | June 15, 1880 |
| 247,573 | Milligan | Sept. 27, 1881 |
| 668,212 | Powter | Feb. 19, 1901 |
| 705,034 | Cameron | July 22, 1902 |
| 1,186,510 | Eldredge | June 6, 1916 |
| 2,269,898 | Anderson | Jan. 13, 1942 |